United States Patent [19]

Gullickson

[11] Patent Number: 4,877,090

[45] Date of Patent: Oct. 31, 1989

[54] RECIPROCATING IMPLEMENT

[75] Inventor: Zan Gullickson, Barons, Canada

[73] Assignee: Keho Alta Industries Ltd., Barons, Canada

[21] Appl. No.: 97,561

[22] Filed: Sep. 15, 1987

[51] Int. Cl.[4] .......................................... A01B 19/06
[52] U.S. Cl. .................................. 172/102; 172/776; 172/311
[58] Field of Search ...................... 172/776, 54.5, 101, 172/102, 53, 62, 198, 709, 711, 311

[56] References Cited

U.S. PATENT DOCUMENTS

| | | | |
|---|---|---|---|
| 3,186,495 | 6/1965 | Gijzenberg | 172/54.5 |
| 3,245,479 | 4/1966 | Dlugosch | 172/198 X |
| 3,503,452 | 3/1970 | Godbersen | 172/711 X |
| 3,774,694 | 11/1973 | Gates | 172/776 X |
| 4,342,366 | 8/1982 | Schenk | 172/198 X |
| 4,562,779 | 1/1986 | Briggs | 172/311 X |
| 4,685,524 | 8/1987 | Williamson | 172/54.5 |
| 4,694,759 | 9/1987 | Dreyer | 172/709 X |

FOREIGN PATENT DOCUMENTS 0216883  1/1942  Switzerland .................. 172/102

Primary Examiner—Randolph A. Reese
Assistant Examiner—Jeffrey L. Thompson
Attorney, Agent, or Firm—Bull, Housser & Tupper

[57] ABSTRACT

An implement has a transversely extending body and a mechanism for supporting the implement and for permitting transverse reciprocation of the body. The mechanism includes a plurality of spaced-apart support members connected to the body. Each of the support members is rigid in a direction which is vertical when the implement is positioned for use and is flexible in a transverse direction. The implement may be a harrow having tines extending downwardly from the body, the body having a plurality of hingedly connected sections so the harrow can be connected to, and folded with, a folding cultivator.

13 Claims, 8 Drawing Sheets

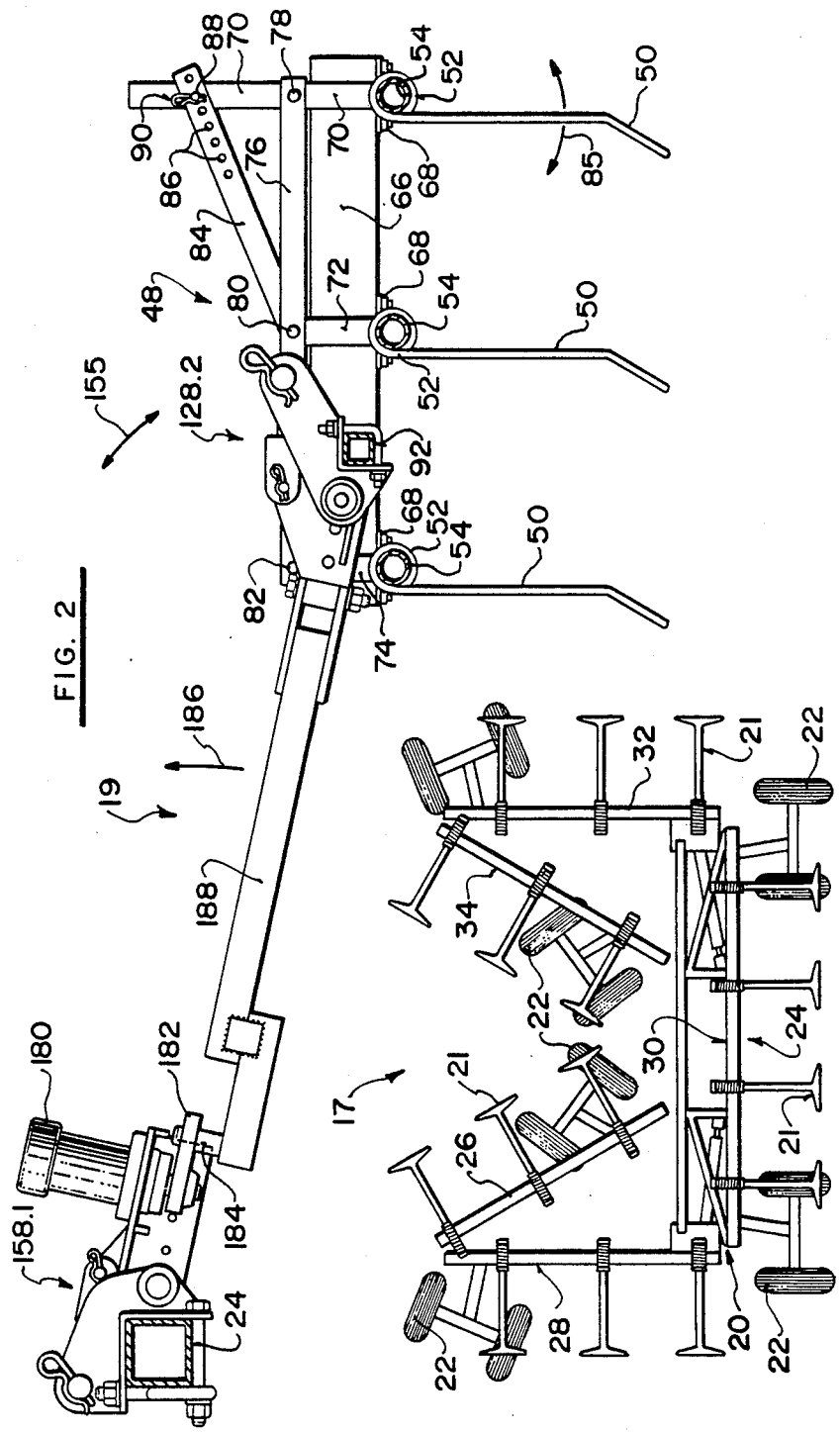

RECIPROCATING IMPLEMENT

BACKGROUND OF THE INVENTION

This invention relates to an implement, such as a harrow, which is reciprocally mounted at the back of another implement, such as a cultivator, preferably both implements having a hinged configuration permitting the widths of the implements to be reduced for transport.

A known type of cultivator, designed to be pulled behind a tractor, is supported by wheels and comprises a plurality of hingedly connected sections. The outer sections are pivoted inwardly to reduce the width of the cultivator to provide easy transport. In farming operations, a harrow is frequently connected behind the cultivator. Preferably the harrow and the cultivator should be connected so that both can be transported together. Thus it is desirable to provide a harrow which can accommodate the folding of such a cultivator.

One approach is to provide a harrow with a plurality of hinged sections corresponding to those of the cultivator. However, if the harrow is to fold with the cultivator, the hinged connections conventionally must align exactly for folding to take place. This means that a different model harrow is required for each model of cultivator having different sized sections.

Alternatively, it is possible to mount a separate, short harrow to the back of each section of the cultivator so that the separate harrows fold with the sections of the cultivator. Not only does this require a multiplicity of harrows, but usually a multiplicity of drive mechanisms where the harrows are of the reciprocating type.

It would therefore be desirable to provide a single reciprocable harrow capable of being connected to a number of different folding cultivators and which would be capable of folding together with the cultivators for transport. It would also be desirable to provide a simple drive mechanism for reciprocating such a harrow.

SUMMARY OF THE INVENTION

The invention provides an implement with a body. There is means for supporting the implement and for permitting transverse reciprocation of the body. The means for supporting and for permitting reciprocation includes a plurality of spaced-apart members connected to the body. Each of the support members is rigid in a direction which is vertical when the implement is positioned for use and is flexible in a transverse direction.

In the preferred form, the implement is a harrow and has a plurality of spaced-apart tines connected to the body.

Preferably the support members are leaf springs which are relatively thin in the transverse direction and relatively broad in a direction which is vertical when the harrow is positioned for use.

The implement may include means for reciprocating the body in the transverse direction. The means for reciprocating may include a motor mounted near the front end of one of the leaf springs, a crank on the motor and an arm having a first end pivotally connected to the crank and a second end pivotally connected to the body.

Another aspect of the invention provides a combination of a first implement and a second implement. The first implement has a front, a back and a body with a plurality of hingedly interconnected sections, permitting the first implement to fold about horizontal axes extending from the front to the back of the first implement. The second implement has a body spaced-apart from the first implement at the back thereof. The second implement has a body with a plurality of hingedly interconnected sections, permitting the second implement to fold about horizontal axes which are parallel to the axes of the first implement. There is means for connecting the second implement to the first implement so, when the implements are positioned for use, downward movement of the second implement relative to the first implement is restricted and transverse reciprocation of the second implement relative to the first implement is permitted. The means for connecting and for permitting reciprocation includes a plurality of elongated members which are flexible in the transverse direction and rigid in the vertical direction.

The invention thus provides a relatively simple means for connecting together two implements so the second implement can be vertically supported and towed by the first implement, while the second implement can be transversely reciprocated. In addition, where the implements are of the folding type, corresponding hinges interconnecting sections of the two implements need not precisely align with each other. Deformation of the support members permits the two implements to fold, even though the hinges are not exactly aligned. This makes it possible to provide a harrow of the folding type which can be mounted on a number of different cultivators and folded therewith even though the sizes of the folding sections of the different cultivators vary to some extent.

BRIEF DESCRIPTION OF THE DRAWINGS

In the drawings:

FIG. 2 is an enlarged sectional view taken along line 2—2 of FIG. 4;

FIG. 3 is a rear elevation of the cultivator of FIG. 1 showing the cultivator folded for transport;

DESCRIPTION OF THE PREFERRED EMBODIMENTS

Figure 1:
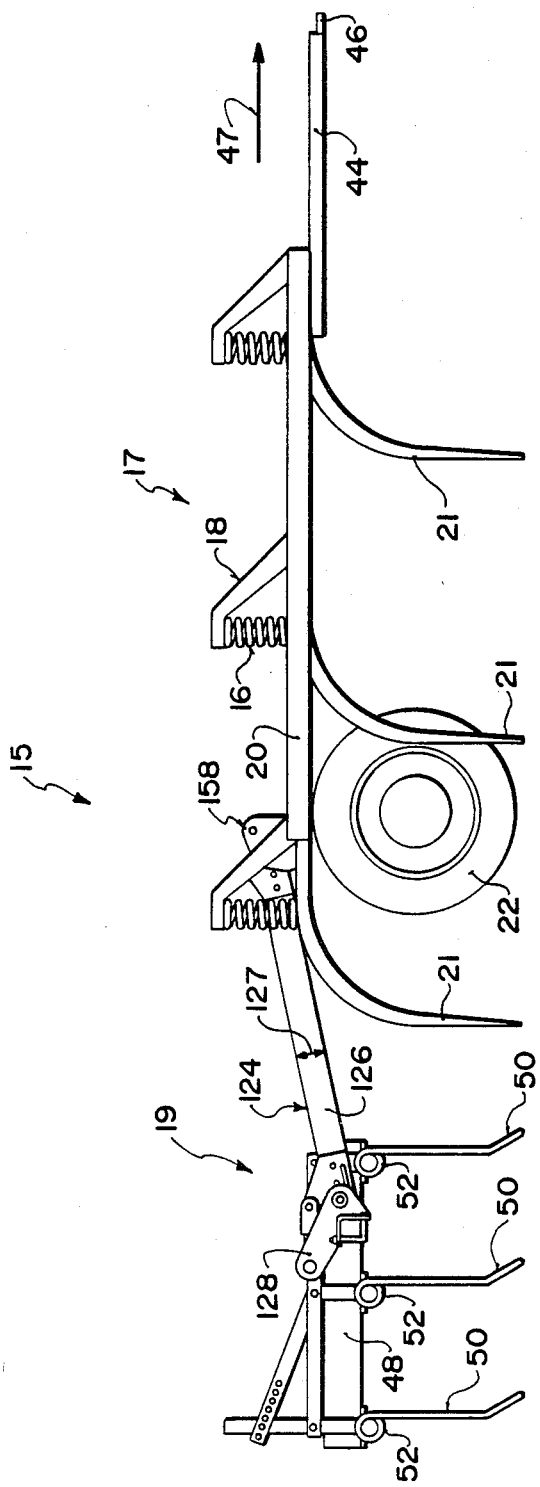
FIG. 1 is a side elevation of a combination cultivator and reciprocating harrow according to an embodiment of the invention.
Figure 4:
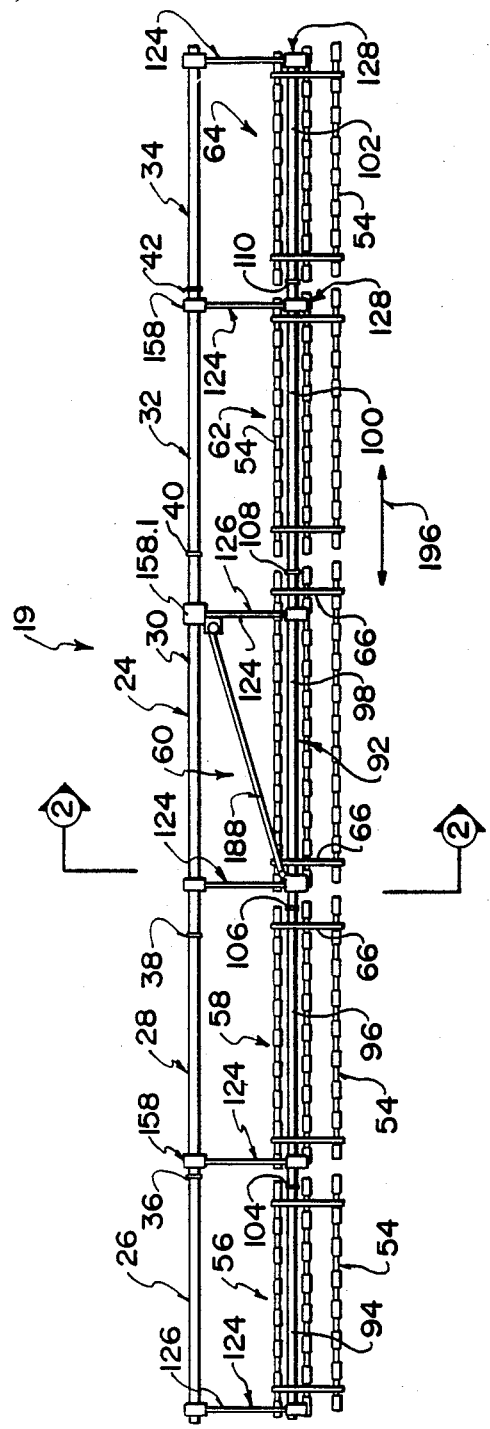
FIG. 4 is a top plan of the harrow of FIG. 1 showing also a longitudinally extending member of the cultivator.

FIG. 1 shows a combination 15 of a first implement, namely cultivator 17, and a second implement, namely a reciprocable harrow 19. Cultivator 17 is of a known type which includes a plurality of downwardly directed tines 21 arranged in spaced-apart relationship along rows. In this case there are three rows as may be observed in FIG. 1. The tines are each resiliently biased downwardly by a coil spring 16 supported at the top by a bracket 18. The cultivator has a body 20, typically of steel members, on which the tines are mounted. The body 20 is supported by a plurality of wheels 22, in this case twelve wheels as seen in FIG. 3. The body 20 has a transversely extending member 24, typically of square tubing, near the back end and shown in FIGS. 2, 3 and 4. The body has a plurality of hingedly interconnected sections permitting the cultivator to be folded for transport as seen in FIG. 3. In this case there are five sections 26, 28, 30, 32 and 34 of member 24 as shown in FIG. 4. The sections are hingedly connected together at points 36, 38, 40 and 42. The cultivator has a draw bar 44 and a trailer hitch 46, both shown in FIG. 1, for permitting the cultivator to be pulled by a tractor. The cultivator as described above is conventional.

Figure 5:
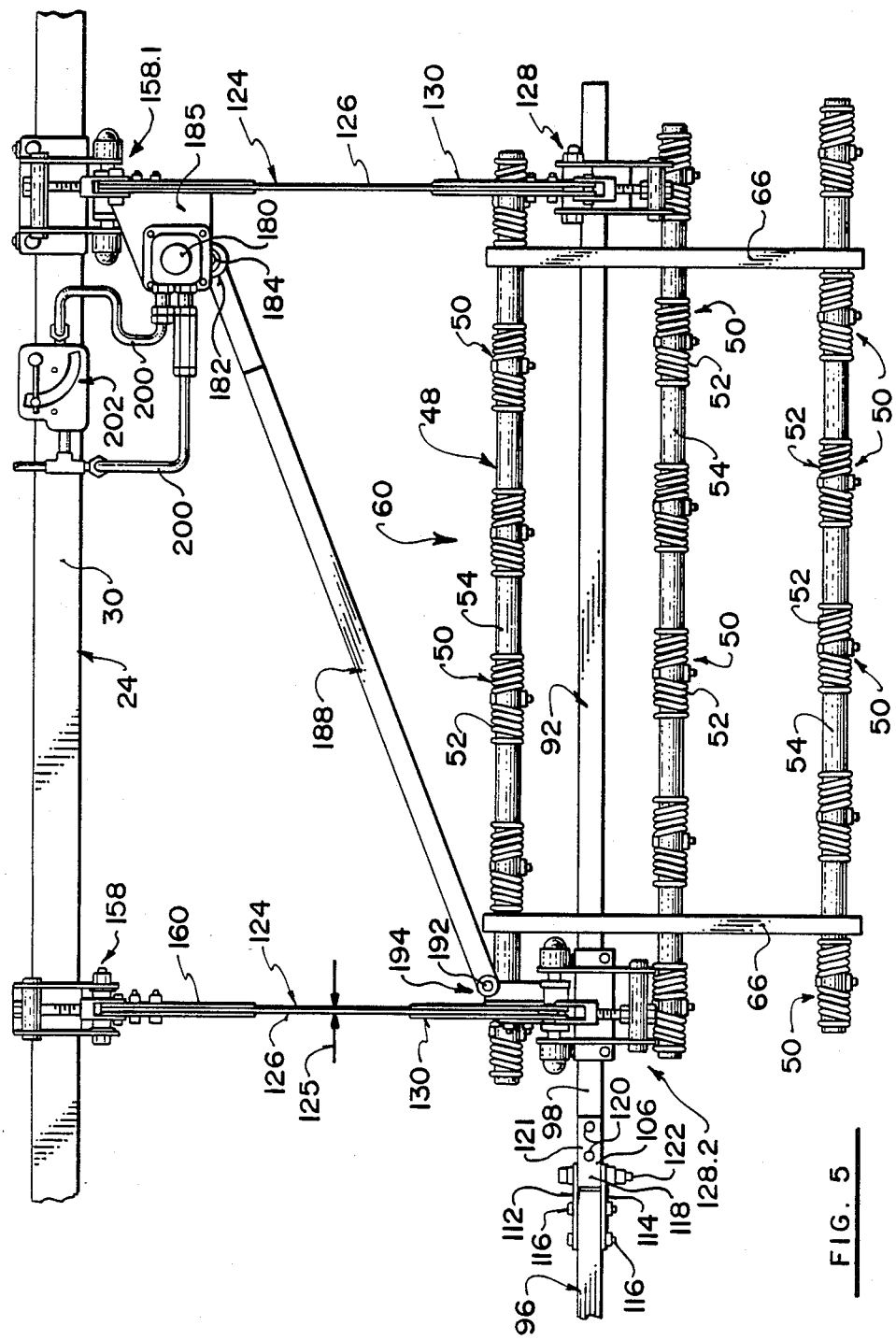
FIG. 5 is an enlarged fragmentary, top plan of a section of the harrow of FIGS. 1 and 4.

The combination 15 shown in FIG. 1 also includes the harrow 19 according to the invention. The harrow has a body 48 on which is mounted a plurality of tines 50 arranged in this case in three rows as seen in FIG. 1 and FIG. 5. Each of the tines 50 has a top 52 coiled about a length of tubing 54. As may be observed in FIG. 4, this embodiment has three rows of tubing 54 with five lengths of tubing in each row although different configurations could be chosen. The lengths of tubing in each row are axially spaced apart as may be observed, dividing the harrow into five sections shown generally at 56, 58, 60, 62 and 64. The longitudinal axes of the lengths of tubing 54 extend in a transverse direction of the combination, that is parallel to arrow 196 of FIG. 4 and perpendicular to the direction in which the combination is pulled utilizing hitch 46 shown in FIG. 1 illustrated by arrow 47.

One of the sections of the harrow, namely section 60, is shown enlarged in FIG. 5, the length of the section and number of tines being reduced for simplicity. It may be seen that the three lengths of tubing 54 are interconnected by a pair of perpendicular members 66 shown also in FIG. 2. The lengths of tubing 54 are rotatably supported in bearings 68 mounted on the bottoms of members 66 shown only in FIG. 2. As shown best in FIG. 2, levers 70, 72 and 74 extend upwardly from the lengths of tubing 54 and are rigidly connected thereto by suitable means such as welding in this embodiment. An elongated member 76 extends parallel to members 66 and is pivotally connected to the levers by means of bolts 78, 80 and 82. It may be observed that lever 70 is appreciably longer than levers 72 and 74. An adjustable link 84 is pivotally connected to member 76 and lever 72 by means of the bolt 80. The opposite end has a plurality of apertures 86, one of which pivotally receives a pin 88 extending from lever 70. A cotter pin 90 extending through a small aperture in pin 88 holds link 84 on the pin. The angles of tines 50 can be altered, as illustrated by arrow 85, by moving pin 88 into different apertures 86 in link 84.

Referring to FIG. 4, the body 48 of harrow 19 also includes a transversely extending member 92 which comprises sections which are hingedly interconnected. Each of the sections is a length of square tubing in the preferred embodiment which has five sections 94, 96, 98, 100 and 102 interconnected by hinges 104, 106, 108 and 110. As shown in FIG. 5 for hinge 106, in this embodiment each hinge has a pair of plates 112 and 114 bolted to one of the sections of member 92, in this case section 96, by a pair of bolts 116. A pair of plates 121 on the top and bottom of the adjacent section, in this case section 98, are held in place by a pair of bolts 120. Only the top plate 121 is shown in FIG. 5. A bolt 122 extends through apertures in plates 112 and 114 and through a tube 118 carried between the pair of plates 121. This permits the sections to hinge relative to each other for folding of the harrow similar to the folding of the cultivator shown in FIG. 3.

The harrow 19 has means for supporting the harrow and for permitting reciprocation of the harrow in the transverse direction. This means includes a plurality of spaced-apart support members 124, six being used in the preferred embodiment as shown in FIG. 4. Each support member 124 includes a leaf spring 126 which is relatively thin in the horizontal, transverse dimension 125 best seen in FIG. 5. The leaf springs are relatively broad in the dimension 127 which is generally vertical when the harrow is positioned for use as shown best in FIG. 1. Thus, resilient deflection of leaf springs 126 permits transverse reciprocation of the body 48 and tines 50 shown by arrow 196 in FIG. 4.

Figure 10:
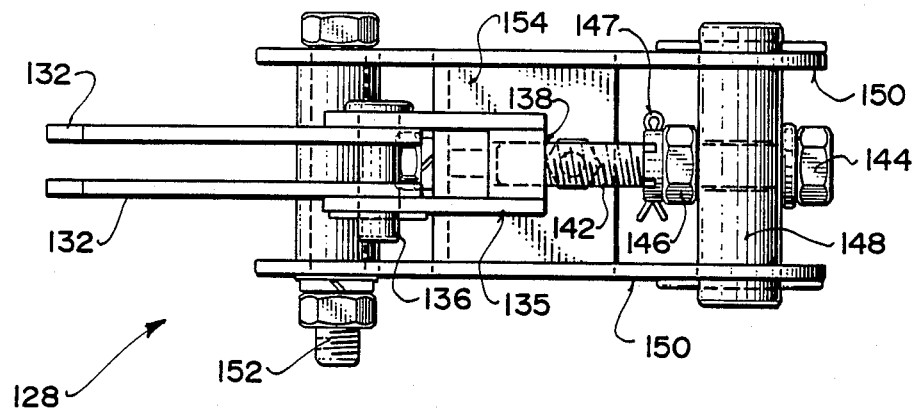
FIG. 10 is a fragmentary top plan showing one of the clamp assemblies for connecting leaf springs to a transversely extending member of the harrow.
Figure 11:
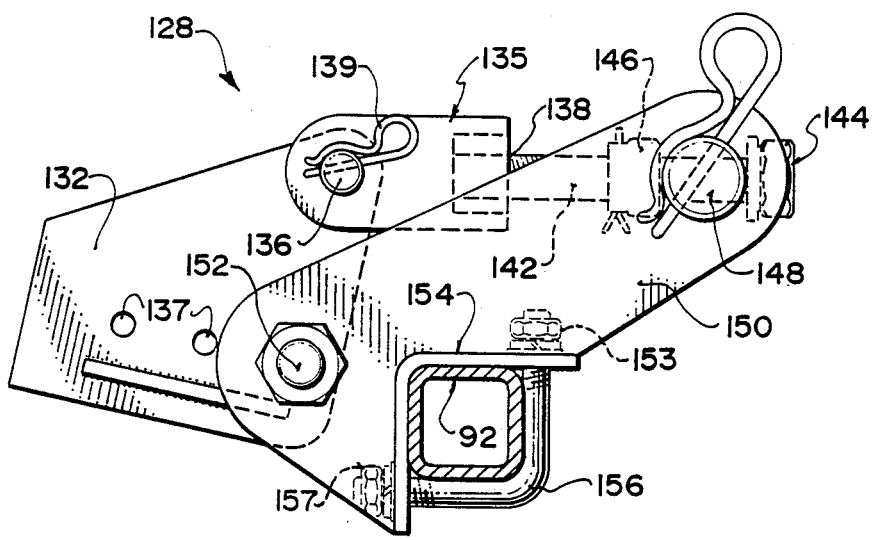
FIG. 11 is a side elevation of the clamp assembly of FIG. 10.

A clamp assembly 128 is provided at end 130 of most of the leaf springs 126 as shown in FIGS. 1 and 5. Each clamp assembly 128, shown in detail in FIGS. 10 and 11, includes a pair of side plates 132 connected to each side of the leaf spring by a pair of bolts (not shown) which extend through apertures 137. A clevis 135 is pivotally connected to the plates 132 by a pin 136 held in place by a cotter 139. The clevis has a threaded aperture 138 threadedly engaging a bolt 142. The bolt 142 has a head 144. A lock nut 146 threadedly engages bolt 142 and is held in a position spaced-apart from head 144 by a cotter pin 147. The bolt 142 extends rotatably through a pin 148 extending between a pair of spaced-apart clamp members 150. The clamp members 150 are pivotally secured to plates 132 on opposite sides of leaf springs 126 by means of a bolt 152. A length of right angle section 154 is connected to each of the clamp members 150 and extends therebetween. A right angled bolt member 156 has threads at each end, the ends extending through apertures in the right angle section 154 and receiving nuts 153 and 157 which are tightened to secure transversely extending member 92 between the right angle section 154 and bolt member 156. Thus each of the clamp assemblies 128 serves to connect one of the leaf springs 126 to the transversely extending member 92 on body 48 of harrow 19. At the same time, the assembly permits the angle between the body and the leaf spring to be adjusted as indicated by arrow 155 in FIG. 2. This is accomplished by turning each bolt 142. With conventional right hand threads, the body 48 can be raised relative to the leaf springs 126 by turning bolts 142 clockwise. Likewise, the body can be lowered relative to the leaf springs by rotating the bolts counter-clockwise. The angle is adjustable so that the tines 50 can contact the ground uniformly when the harrow is connected to a particular cultivator.

Figure 6:
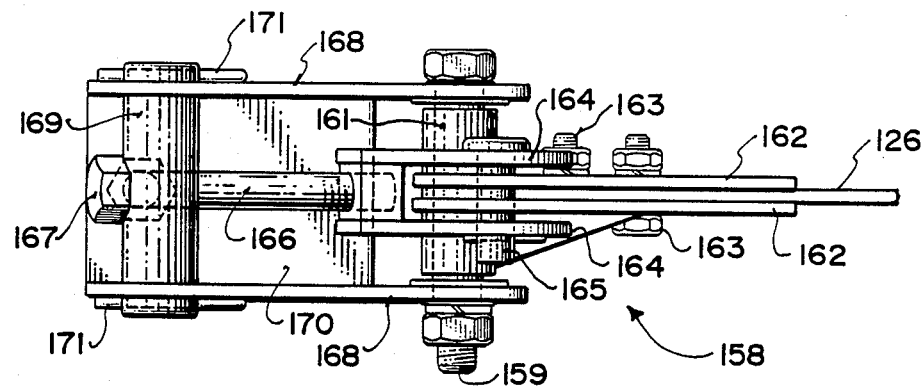
FIG. 6 is an enlarged fragmentary top plan showing one of the clamp assemblies for connecting the harrow to the cultivator.
Figure 7:
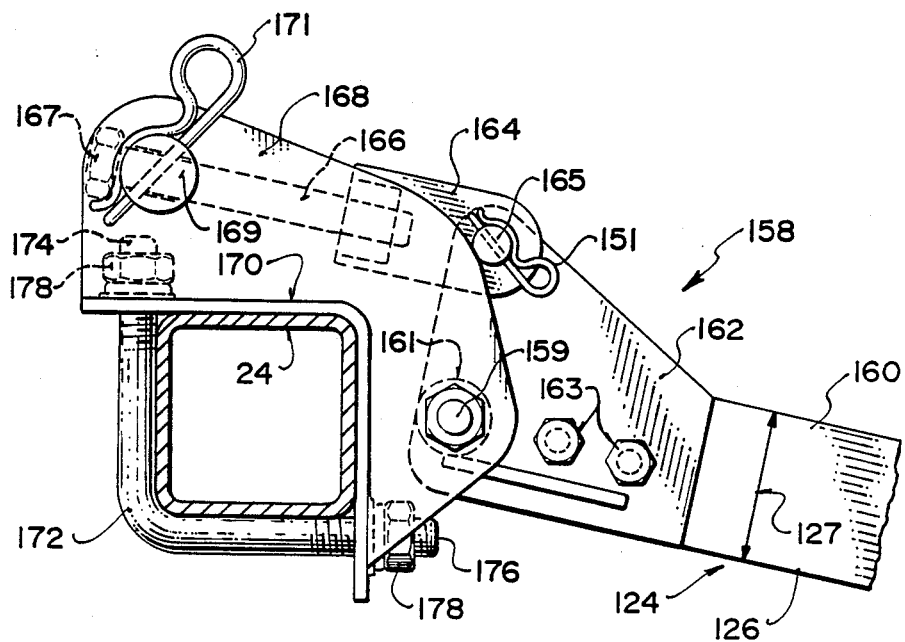
FIG. 7 is a side elevation of the clamp assembly of FIG. 6, showing a transversely extending member of the cultivator in section.

The connection between the cultivator and the harrow is accomplished by means of a plurality of second clamp assemblies 158, as shown in FIG. 5, mounted on ends 160 of leaf springs 126 distal body 48 of the harrow. As shown in FIGS. 6 and 7 clamp assemblies 158 are similar to clamp assemblies 128. A pair of plates 162 is connected to end 160 of each of the leaf springs by bolts 163. The plates are connected to a clevis 164 by pin 165 held in place by cotter 151. The clevis is pivotally connected to a pair of spaced-apart clamp members 168 by a bolt 166 with a head 167 and extending slidably through pin 169 held in place by a pair of cotters 171. The clamp members are pivotably connected to plates 162 by bolt 159 and bushing 161. A length of right angle section 170 extends between the clamp members 168. A right angle bolt member 172 has threaded ends 174 and 176 extending through apertures in the angle section. A pair of nuts 178 secure the right angle bolt member to the angle section. The nuts are tightened to secure each of the clamp assemblies 158 to the transversely extending member 24 of the cultivator 17.

Figure 8:
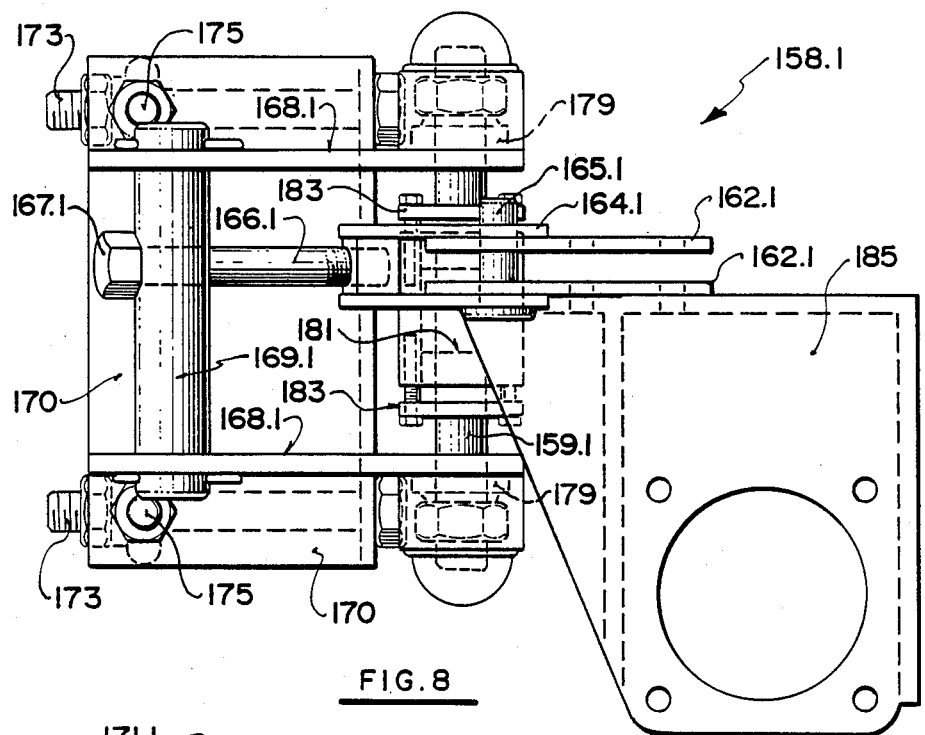
FIG. 8 is a view similar to FIG. 6 showing a clamp assembly modified to carry a motor mount for a reciprocating mechanism.
Figure 9:
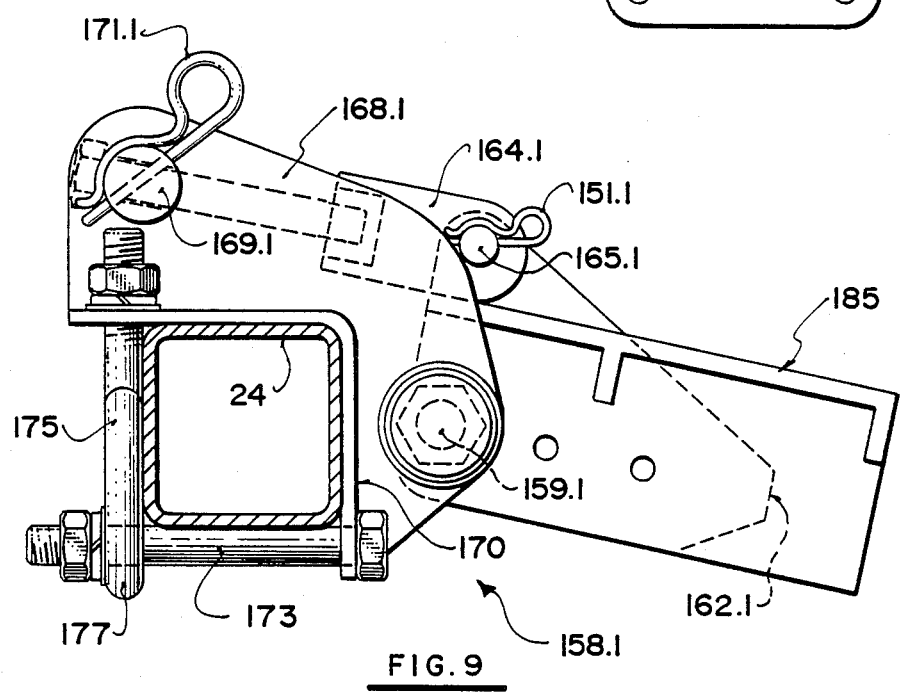
FIG. 9 is a side elevation of the clamp assembly of FIG. 8, showing the transversely extending member of the cultivator in section.

One of the clamp assemblies for connecting the harrow to the cultivator is slightly different from the others, namely assembly 158.1 shown in FIGS. 8 and 9. Reference will be made only to the differences between this assembly and assembly 158, equivalent parts having the additional designation ".1". In place of the right angle bolt member, a pair of conventional bolts 173 are used extending through eyes 177 of a pair of eye bolts 175 to clamp transversely extending member 24.

A shaft 159.1 is rotatably mounted on clamp members 168.1 by bearings 179 to replace bolt 159. A motor mount 185 is rigidly connected to plates 162.1 and to a bushing 181 by welding in this embodiment. A pair of thin bushings 183 are clamped onto shaft 159.1, by means of a taper fit inside the bushing 181 and bolted to bushing 181 so the motor mount and plates 162.1 with connected leaf springs rotate with shaft 159.1.

Figure 12:
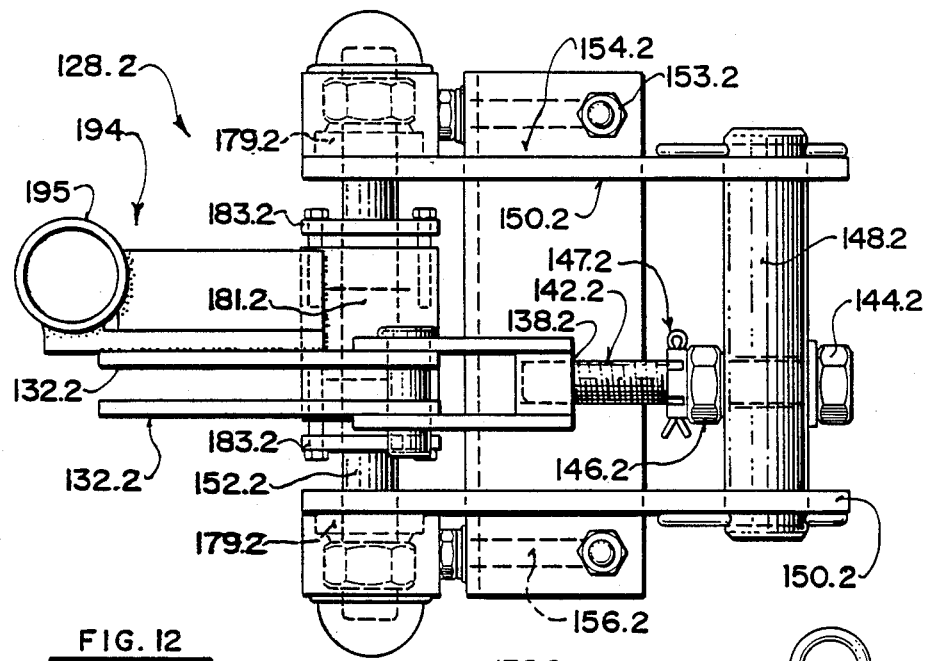
FIG. 12 is a top plan of a clamp assembly similar to FIG. 10, but modified for the reciprocating mechanism.
Figure 13:
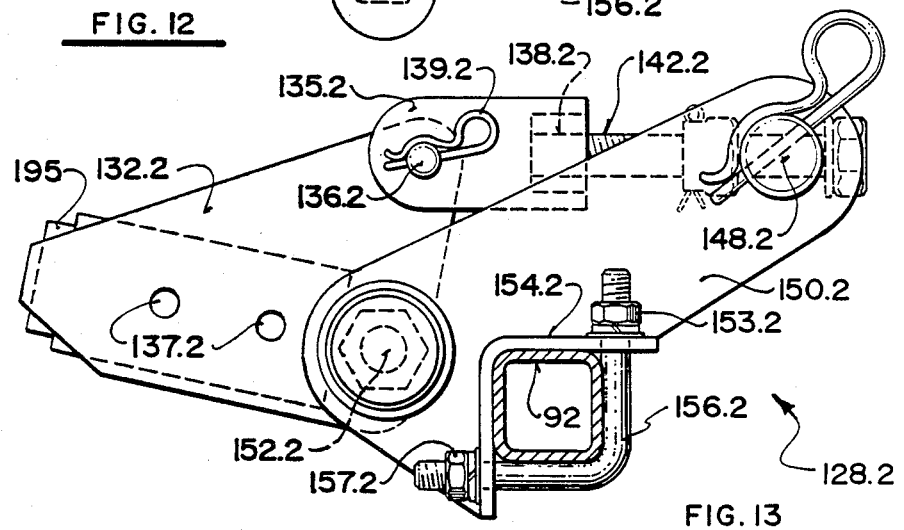
FIG. 13 is a side elevation of the clamp assembly of FIG. 12, showing the transversely extending member of the harrow in section.
Figure 14:
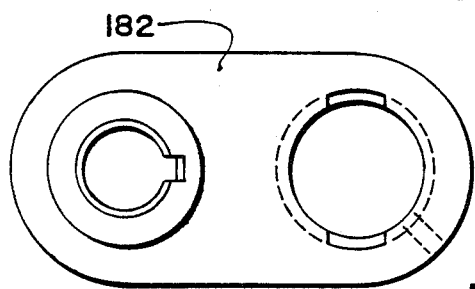
FIG. 14 is a top plan of a crank for the reciprocating mechanism.

A motor, in this case an hydraulic motor 180, is mounted on the motor mount 185 as seen in FIG. 5. There is a crank 182 extending from the motor and pivotably connected to a pin 184. The crank is shown in detail in FIG. 14. The pin is connected to an elongated arm 188 best seen in FIGS. 2 and 5. As best seen in FIG. 5, the end of arm 188 opposite motor 180 is pivotably connected to a mount 194 by a pin 192. The mount 194 is part of a clamp assembly 128.2 shown in FIGS. 12 and 13 which, besides serving as a connection point for the arm 188, serves a function similar to clamp assemblies 128 described above. It is broader, but otherwise similar, to clamp assemblies 128 and is therefore not described in detail but modified in a manner similar to the changes in clamp assembly 158.1 compared to assemblies 158. Parts equivalent to those previously described have the additional designation ".2". The mount 194 has a bushing 195 for rotatably receiving the pin 192.

The operation of the combination 15 of the cultivator 17 and harrow 19 is easy and efficient. The harrow is connected to the transversely extending member 24 of the cultivator using clamp assemblies 158 and 158.1. After being connected, heads 144 and 144.2 on bolts 142 and 142.2 of clamp assemblies 128 and 128.2 are rotated to adjust the angle of the body 48 of the harrow so that the tines 50 are all in contact with the ground. Downward movement is limited by the heads 167 and 167.1 of bolts 166 and 166.1 contacting pins 169 and 169.1 as shown in FIGS. 6 and 8. However, upward rotation of the body and tines of the harrow, illustrated by arrow 186 in FIG. 2, is permitted about pins 169 and 169.2 of the clamp assemblies 158 and 158.2 by bolts 166 and 166.1 sliding through pins 169 and 169.1. This permits the body and tines of the harrow assembly to pivot downwardly relative to the cultivator so the tines enter the ground the desired amount. However, it permits the harrow, to be raised with the cultivator for transport. As discussed above, the angles of the tines of the harrow can be adjusted by means of pins 88 and apertures 86 in links 84 as shown in FIG. 2.

FIG. 4 shows the harrow connected to transversely extending member 24 of the cultivator and unfolded for normal operation. Hydraulic fluid is supplied to hydraulic motor 180, shown in FIG. 5, by hydraulic lines 200 and controls 202, causing crank 182 to rotate. This reciprocates elongated arm 188 connected to pin 192 connected to mount 194 on the body of the harrow. Thus the rotating motor reciprocates the body of the harrow and the tines in the transverse direction represented by arrows 196 in FIG. 4. The reciprocation is accommodated by resilient bending of the leaf springs 126.

When it is desired to transport the combination, the cultivator is raised in the conventional manner. This raises the harrow when heads 167 and 167.1 of bolts 166 and 166.1 contact pins 169 and 169.1 as shown in FIGS. 6 and 8. The cultivator can then be folded to the position shown in FIG. 3 in the conventional manner. As disclosed above, the hinges are in line with points 36, 38, 40 and 42 on transversely extending member 24 shown in FIG. 4. When the cultivator is being folded, it causes the harrow to fold in a similar manner at hinges 104, 106, 108 and 110. However, as may be seen in FIG. 4, the hinges of the harrow are not exactly in line with the hinge points of the cultivator in this embodiment. This illustrates that the invention is capable of accommodating harrows and cultivators having sections of different lengths for folding. Because the leaf springs 126 are resilient, they simply bend to accommodate non-aligned hinges of the cultivator and harrow when they are folded. Obviously the resilient deflection of the leaf springs can accommodate only a certain degree of misalignment. This degree depends upon such factors as the configurations of the harrow and cultivator, and the size and materials of components.

It will be understood by people skilled in the art that many modifications can be made to the embodiments described above without departing from the invention. Accordingly, the scope of the invention is to be determined by reference to the following claims and is not limited to all of the details described above.

What is claimed is:

1. A harrow, comprising:
  a body having a front and a plurality of spaced apart tines;
  means for transversely reciprocating the body;
  means for supporting the harrow vertically and for permitting transverse reciprocation of the body, the means for supporting and for permitting transverse reciprocation including a plurality of spaced apart support members connected to the body, each of the support members being rigid in one direction to provide vertical support for the body and being flexible in a second direction, which is perpendicular to said one direction, to accommodate said transverse reciprocation, the support members including leaf springs extending from the front of the body and being spaced apart and parallel, the leaf springs being elongated and relatively broad in said one direction, which is vertical when the harrow is positioned for use, and relatively thin in said second direction which is transverse when the harrow is positioned for use, the leaf springs having front ends which are distal with respect to the body, the harrow further including a clamp at the front end of each of the leaf springs capable of securing the harrow to a cultivator.

2. A harrow as claimed in claim 1, wherein each of the clamps has a square opening.

3. A harrow as claimed in claim 1, wherein the leaf springs are pivotally connected to the clamps for vertical pivoting of the frame and leaf springs.

4. A harrow as claimed in claim 3, further including stop means for limiting downward pivoting of the leaf springs and the body relative to the clamps.

5. A combination comprising:
   a first implement having a front and a back and a body with a plurality of hingedly interconnected sections permitting the first implement to fold about horizontal axes extending from the front to the back of the first implement;
   a second implement having a body spaced-apart from the first implement at the back thereof, the second implement having a body with a plurality of hingedly interconnected sections permitting the second implement to fold about horizontal axes which are parallel to the axes of the first implement; and
   means for connecting the second implement to the first implement so, when the implements are positioned for use, downward movement of the second implement relative to the first implement is restricted and movement of the second implement relative to the first implement is permitted in a transverse direction, the means for connecting including a plurality of elongated members which are flexible in said transverse direction and rigid in a direction which is generally vertical when the implements are positioned for use.

6. A combination as claimed in claim 5, wherein the means for connecting includes a plurality of leaf springs extending between the second implement and the first implement, each of the springs being elongated in a longitudinal direction extending between the second implement and the first implement, being relatively broad in the vertical direction and being relatively thin in the transverse direction which is perpendicular to the longitudinal direction and to the vertical direction.

7. A combination as claimed in claim 6, further comprising means for reciprocating the second implement relative to the first implement in the transverse direction.

8. A combination as claimed in claim 6, wherein the means for reciprocating includes a motor having a mount operatively connected to the first implement, a crank on the motor and an arm having a first end pivotally connected to the crank and having a second end pivotally connected to the body of the second implement.

9. A combination as claimed in claim 8, wherein the mount is connected to an end of one of the leaf springs adjacent the first implement.

10. A combination as claimed in claim 6, further comprising stop means for limiting downward movement of the second implement.

11. A combination as claimed in claim 5, wherein the leaf springs are pivotally connected to members mounted on the body of the second implement, the combination further including means for adjusting an angle between the second implement and the leaf springs, said means for adjusting including threaded members interconnecting a member on the body of the second implement and a member connected to the leaf springs.

12. A combination as claimed in claim 5, wherein the first implement is a cultivator supported on wheels and the second implement is a harrow having a plurality of spaced-apart tines mounted on the body.

13. A harrow, comprising:
   a body having a front and a plurality of spaced apart tines;
   means for transversely reciprocating the body;
   means for supporting the harrow vertically and for permitting transverse reciprocation of the body, the means for supporting and for permitting transverse reciprocation including a plurality of spaced apart support members connected to the body, each of the support members being rigid in one direction to provide vertical support for the body and being flexible in a second direction, which is perpendicular to said one direction, to accommodate said transverse reciprocation, the support members including leaf springs extending from the front of the body and being spaced apart and parallel, the leaf springs being elongated and relatively broad in said one direction, which is vertical when the harrow is positioned for use, and relatively thin in said second direction which is transverse when the harrow is positioned for use, the leaf springs having front ends which are distal with respect to the body, the means for reciprocating including a motor mounted adjacent the front ends of the leaf springs, a crank on the motor, and an arm having a first end pivotally connected to the crank and a second end operatively connected to the body in a pivotal manner.

* * * * *